(No Model.)
D. & T. MORRIS & C. A. KERN.
PROCESS OF HOPPING AND PRESERVING BEER WITH CARBONIC ACID GAS.
No. 343,595. Patented June 15, 1886.
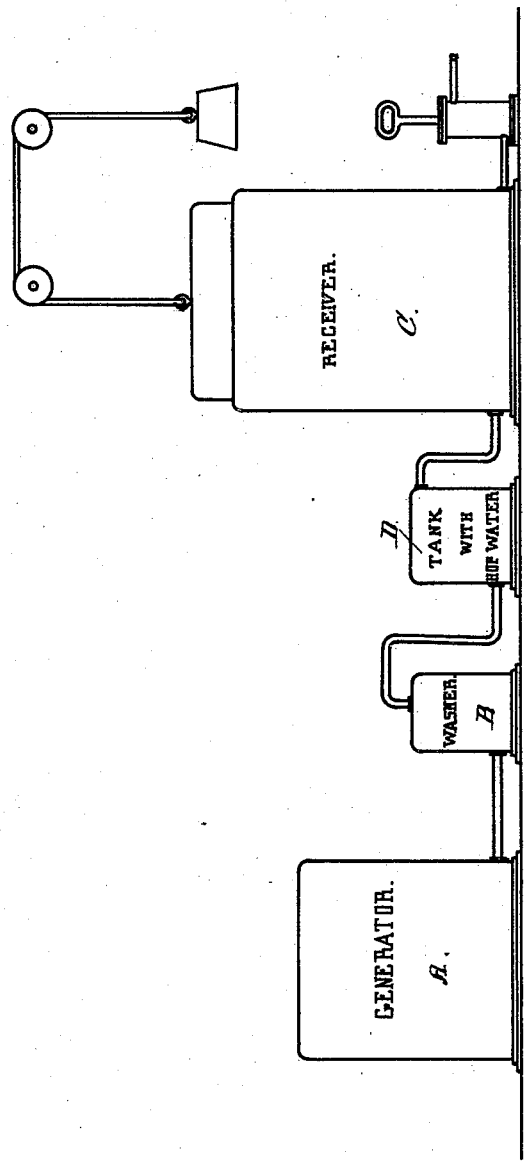
Witnesses:
Wm Mayer
Joseph E. Paus
Inventor:
David Morris Theo Morris
By and Carl A. Kern
C. W. M. Smith. Atty.

UNITED STATES PATENT OFFICE.

DAVID MORRIS, THEODORE MORRIS, AND CARL ALBERT KERN, OF SAN FRANCISCO, CALIFORNIA; SAID KERN ASSIGNOR TO SAID DAVID MORRIS AND THEODORE MORRIS.

PROCESS OF HOPPING AND PRESERVING BEER WITH CARBONIC-ACID GAS.

SPECIFICATION forming part of Letters Patent No. 343,595, dated June 15, 1886.

Application filed January 13, 1886. Serial No. 183,460. (No specimens.)

*To all whom it may concern:*

Be it known that we, DAVID MORRIS, THEODORE MORRIS, and CARL ALBERT KERN, citizens of the United States, residing in the city and county of San Francisco, and State of California, have invented certain new and useful Improvements in the Process of Hopping and Preserving Beer with Carbonic-Acid Gas; and we do hereby declare that the following is a full, clear, and exact description of our invention and of the manner in which we proceed to apply, carry out, and make use of the same.

Our invention relates to improvements in methods and processes of hopping and preserving beer on draft by means of carbonic-acid gas; and our improvements consist in charging or impregnating the gas with the aroma and virtues of hops before introducing it into the beer, and in the production of a hop compound or mixture for charging carbonic-acid gas for the purpose.

We produce and carry out our said invention in the following manner: After the carbonic-acid gas is made and is properly prepared by washing we lead it into a vessel containing an infusion of hops, through which we force it or cause it to pass in such manner that the aroma and virtues common to the hops are taken up and a gas charged or impregnated with the same is produced.

The hop compound is produced as follows: A quantity of fresh dried hops is pulverized in a mortar, and being wet with alcohol and water in about equal parts the same is pressed into a percolator. To one-half pound of hops we take about one pound of alcohol and an equal quantity of water. When the pulverized hops are put into the percolator, about one-half of water and alcohol mixture is poured in, and as the liquid begins to drop from the outlet the opening is stopped and the contents allowed to stand in the vessel for about twelve hours. At the end of that time the cork is removed, and as the liquid begins to discharge again the remainder of the water and alcohol is poured into the hops. After this liquid has passed through the percolator about two pints of water are run through. To the liquid thus obtained we add about two ounces of glycerine and one-half ounce of ether. Twenty drops of this mixture will be found sufficient to use in a wash-tank of the ordinary kind used in the production of carbonic-acid gas. The gas being passed through the tank or vessel containing this mixture, is then forced into the beer in cask by connecting the cask with a gas-receiver in which the gas is held under suitable pressure, the connection being made as is customary and always provided for by pipes or tubes with valve-cocks and other regulating devices to control the pressure within the cask.

An apparatus for hopping the gas would consist of a gas-generator, a washer, and a gas-holder, all of any well known construction.

Between the washer and the gas-holder is placed a gas-tight vessel containing the hopping-liquid, and by suitable pipes the gas from the washer is carried through the liquid and thence into the gas-holder, from which by means of a pump it is forced into portable receivers under pressure.

In the drawing that accompanies this specification, A represents the generator; B, the gas-washer; C, the gas-holder, and D the vessel containing the infusion of hops.

Having thus fully described our invention, what we claim, and desire to secure by Letters Patent, is—

1. The herein-described method of treating beer to preserve and improve the same, which consists in forcing into the cask under pressure carbonic-acid gas that has been previously passed through an infusion of hops, substantially as set forth.

2. The process herein described for hopping beer, which consists in impregnating the carbonic-acid gas with the hops compound intermediate between the carbonic-acid-gas receiver and beer-container.

3. The herein-described improvement in treating beer by means of carbonic-acid gas, which consists in charging or impregnating the gas with the aroma and virtues of hops before introducing it into the cask or vessel containing the beer.

4. The herein-described mixture or compound for hopping carbonic-acid gas produced from hops, water, alcohol, glycerine, and ether, in the manner and about the proportions set forth.

In testimony that we claim the foregoing we have hereunto set our hands and seals.

DAVID MORRIS. [L. S.]
  THEODORE MORRIS. [L. S.]
  CARL ALBERT KERN. [L. S.]

Witnesses:
  J. H. BLOOD,
  J. BULSON.